United States Patent
Tsfaty et al.

(10) Patent No.: US 9,830,298 B2
(45) Date of Patent: Nov. 28, 2017

(54) MEDIA TIME BASED USB FRAME COUNTER SYNCHRONIZATION FOR WI-FI SERIAL BUS

(71) Applicant: QUALCOMM Incorporated, San Diego, CA (US)

(72) Inventors: Yossef Tsfaty, Rishon-Le-Zion (IL); Xiaodong Wang, San Diego, CA (US); Alireza Raissinia, Monte Sereno, CA (US); Vijayalakshmi Rajasundaram Raveendran, San Diego, CA (US); Xiaolong Huang, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 735 days.

(21) Appl. No.: 14/270,124

(22) Filed: May 5, 2014

(65) Prior Publication Data

US 2014/0344490 A1 Nov. 20, 2014

Related U.S. Application Data

(60) Provisional application No. 61/823,805, filed on May 15, 2013.

(51) Int. Cl.
| | |
|---|---|
| *G06F 13/24* | (2006.01) |
| *G06F 13/42* | (2006.01) |
| *H04J 3/06* | (2006.01) |

(52) U.S. Cl.
CPC ...... *G06F 13/4286* (2013.01); *G06F 13/4282* (2013.01); *H04J 3/06* (2013.01); *G06F 2213/0042* (2013.01)

(58) Field of Classification Search
CPC ..... G06F 13/4286; G06F 13/4282; H04J 3/06
(Continued)

(56) References Cited

U.S. PATENT DOCUMENTS

| | | | | |
|---|---|---|---|---|
| 5,943,328 A | * | 8/1999 | Hosford | ................ H04J 3/0602 370/331 |
| 6,389,029 B1 | * | 5/2002 | McAlear | ................ H04L 12/46 370/402 |

(Continued)

FOREIGN PATENT DOCUMENTS

| | | |
|---|---|---|
| CN | 101794269 A | 8/2010 |
| TW | 583549 B | 4/2004 |

(Continued)

OTHER PUBLICATIONS

Wireless Universal Serial Bus Specification. Revision 1.0. May 12, 2005.*

(Continued)

*Primary Examiner* — Paul R Myers
(74) *Attorney, Agent, or Firm* — Paradice and Li LLP

(57) ABSTRACT

A method of transmitting universal serial bus (USB) frames over a communications channel is disclosed. A USB device receives one or more USB frames from a host device via a network, wherein the one or more USB frames are encapsulated in one or more data packets based on a communications protocol associated with the network. The USB device further synchronizes a local clock signal with a clock signal of the host device using a clock synchronization mechanism of the communications protocol. The USB device then determines a number of USB frames transmitted by the host device and processes the one or more USB frames based, at least in part, on the synchronized local clock signal. For some embodiments, the USB device may receive a frame count value and a corresponding media time value from the host device.

34 Claims, 10 Drawing Sheets

(58) Field of Classification Search
USPC ... 710/33, 34, 52, 60, 63, 64, 300, 105, 110, 710/313; 713/400, 500, 600
See application file for complete search history.

(56) References Cited

U.S. PATENT DOCUMENTS

| | | | |
|---|---|---|---|
| 6,934,752 B1* | 8/2005 | Gubbi | H04L 69/324 370/392 |
| 6,978,412 B1* | 12/2005 | Reents et al. | 714/746 |
| 7,065,036 B1* | 6/2006 | Ryan | 370/208 |
| 7,406,476 B1* | 7/2008 | Galloway et al. | |
| 7,668,243 B2* | 2/2010 | Ho et al. | 375/240.28 |
| 7,734,758 B1 | 6/2010 | Lo Bue et al. | |
| 8,386,658 B2* | 2/2013 | Lee | 710/10 |
| 8,493,992 B2* | 7/2013 | Sella et al. | 370/445 |
| 8,560,753 B1* | 10/2013 | Hobbs | G06F 3/1454 345/2.1 |
| 8,943,351 B2* | 1/2015 | Foster | 713/400 |
| 9,412,332 B2* | 8/2016 | Smadi | H04N 19/172 |
| 9,641,916 B2* | 5/2017 | Chen | H04Q 11/0003 |
| 2003/0043771 A1* | 3/2003 | Mizutani et al. | 370/338 |
| 2003/0086388 A1* | 5/2003 | Peters et al. | 370/328 |
| 2008/0071936 A1* | 3/2008 | Sugaya | 710/12 |
| 2008/0117919 A1* | 5/2008 | Kliger | H04L 69/324 370/400 |
| 2009/0204843 A1* | 8/2009 | Celinski et al. | 713/400 |
| 2010/0027523 A1* | 2/2010 | Chan et al. | 370/345 |
| 2010/0086093 A1 | 4/2010 | Sheet | |
| 2011/0116426 A1* | 5/2011 | Polonsky et al. | 370/310 |
| 2012/0072636 A1* | 3/2012 | Derr et al. | 710/308 |
| 2014/0075567 A1* | 3/2014 | Raleigh | H04W 12/10 726/26 |
| 2015/0036733 A1* | 2/2015 | Smadi | H04N 19/172 375/240.01 |
| 2015/0324322 A1* | 11/2015 | Jensen | 710/12 |

FOREIGN PATENT DOCUMENTS

| | | |
|---|---|---|
| TW | I226547 B | 1/2005 |
| TW | I270784 B | 1/2007 |

OTHER PUBLICATIONS

International Search Report and Written Opinion—PCT/US2014/037035—ISA/EPO—dated Sep. 29, 2014.
Taiwan Search Report—TW103117039—TIPO—dated Nov. 11, 2015.

* cited by examiner

MEDIA TIME BASED USB FRAME COUNTER SYNCHRONIZATION FOR WI-FI SERIAL BUS

RELATED APPLICATIONS

This application claims priority to U.S. Provisional Patent Application No. 61/823,805, titled "Media Time Based USB Frame Counter Synchronization for Wi-Fi Serial Bus," filed May 15, 2013, which is hereby incorporated by reference in its entirety.

TECHNICAL FIELD

The present embodiments relate generally to communication systems, and specifically to sending universal serial bus (USB) protocol packets over a Wi-Fi channel.

BACKGROUND OF RELATED ART

Various interface standards for connecting computers, external peripherals, and networks are employed to provide simple connectivity at high speeds. For example, the Universal Serial Bus (USB) is a high-speed serial bus protocol commonly used to connect computers such as PCs and laptops to a wide variety of peripheral devices such as mice, keyboards, printers, flash drives, speakers, and the like. More specifically, the USB protocol was developed to offer users an enhanced and easy-to-use interface for connecting an incredibly diverse range of peripherals to their computers in a plug-and-play manner.

More recently, wireless communication protocols have been developed to allow communication devices such as PCs, laptops, tablets and smartphones to connect with other communication devices without physical wires or cables. For example, the IEEE 802.11 standards define various Wi-Fi protocols that allow for wireless communication using RF signals. For example, a Wi-Fi access point may provide a wireless local area network (WLAN) that allows one or more client devices such as mobile stations (STAs) to communicate with each other and/or to connect to external wired networks such as the Internet.

Thus, it would be desirable for a host device (e.g., a computer, laptop, tablet, smartphone) to exchange USB data with a number of client devices (e.g., mice, keyboards, printers, flash drives, speakers) using an associated WLAN, for example, to obviate the need for cabling between the host device and the client devices. Although Bluetooth® technology may allow for wireless communications between the host device and the client devices, WLAN communications have a much greater range than Bluetooth communications.

SUMMARY

This summary is provided to introduce in a simplified form a selection of concepts that are further described below in the Detailed Description. This summary is not intended to identify key features or essential features of the claimed subject matter, nor is it intended to limit the scope of the claimed subject matter.

A method of transmitting universal serial bus (USB) frames over a network is disclosed. A USB device receives one or more USB frames from a host device via the network, wherein the one or more USB frames are encapsulated in one or more data packets based on a communications protocol associated with the network. The USB device further synchronizes a local clock signal with a clock signal of the host device using a clock synchronization mechanism of the communications protocol. For example, the communications protocol may correspond to an IEEE 802.11 wireless protocol. Thus, the USB device may adjust its local clock signal based on a timing synchronization function (TSF) received from the host device (e.g., in one or more beacon frames). The USB device then determines a number of USB frames transmitted by the host device and processes the one or more USB frames based, at least in part, on the synchronized local clock signal.

The USB device may include a data buffer to temporarily store the one or more USB frames received from the host device. The USB device may further update a local frame counter based, in part, on a number of the USB frames stored in the data buffer. Accordingly, the USB device may determine the number of USB frames transmitted by the host device based on the local frame counter. The USB device may then begin processing the USB frames stored in the data buffer when the local frame counter reaches a first threshold.

For some embodiments, the USB device may receive a frame count value, from the host device, indicating a number of USB frames transmitted by the host device. The USB device may also receive a media time value, in association with the frame count value, indicating a time at which the frame count value is recorded. For example, the frame count value and the media time value may be received together, in at least one of the USB frames. The USB device may further synchronize its local frame counter with a USB frame counter in the host device based, in part, on the local clock signal, the frame count value, and the media time value.

For other embodiments, a computing device may encapsulate one or more USB frames in one or more data packets based on a communications protocol associated with a network. The computing device may then transmit the one or more data packets, including the encapsulated USB frames, to one or more devices via the network. The computing device may further transmit a set of synchronization data to the one or more devices to enable each of the one or more devices to process the one or more USB frames.

The synchronization data may include clock synchronization data which enables each of the one or more devices to synchronize a respective local clock signal with a clock signal of the computing device. For example, the communications protocol may correspond to an 802.11 wireless protocol. Accordingly, the computing device may broadcast the clock synchronization data with one or more beacon frames, wherein the clock synchronization data includes a TSF value.

The synchronization data may further include a frame count value and a media time value associated with the frame count value. For example, the computing device may update a USB frame counter based on a number of USB frames transmitted to the one or more devices. The frame count value may indicate a current value of the USB frame counter, while the media time value may indicate a time at which the frame count value is recorded. For some embodiments, the frame count value and the media time value may be encapsulated, together, in at least one of the one or more USB frames.

For some embodiments, the computing device may further transmit a processing request to the one or more devices. The processing request may include an instruction to begin processing the one or more USB frames. For example, the processing request may include a frame count threshold. The one or more devices are to begin processing the one or more USB frames when a number of USB frames transmitted by the computing device is equal to the frame count threshold.

BRIEF DESCRIPTION OF THE DRAWINGS

The present embodiments are illustrated by way of example and are not intended to be limited by the figures of the accompanying drawings, where.

Like reference numerals refer to corresponding parts throughout the drawing figures.

DETAILED DESCRIPTION

Figure 1:
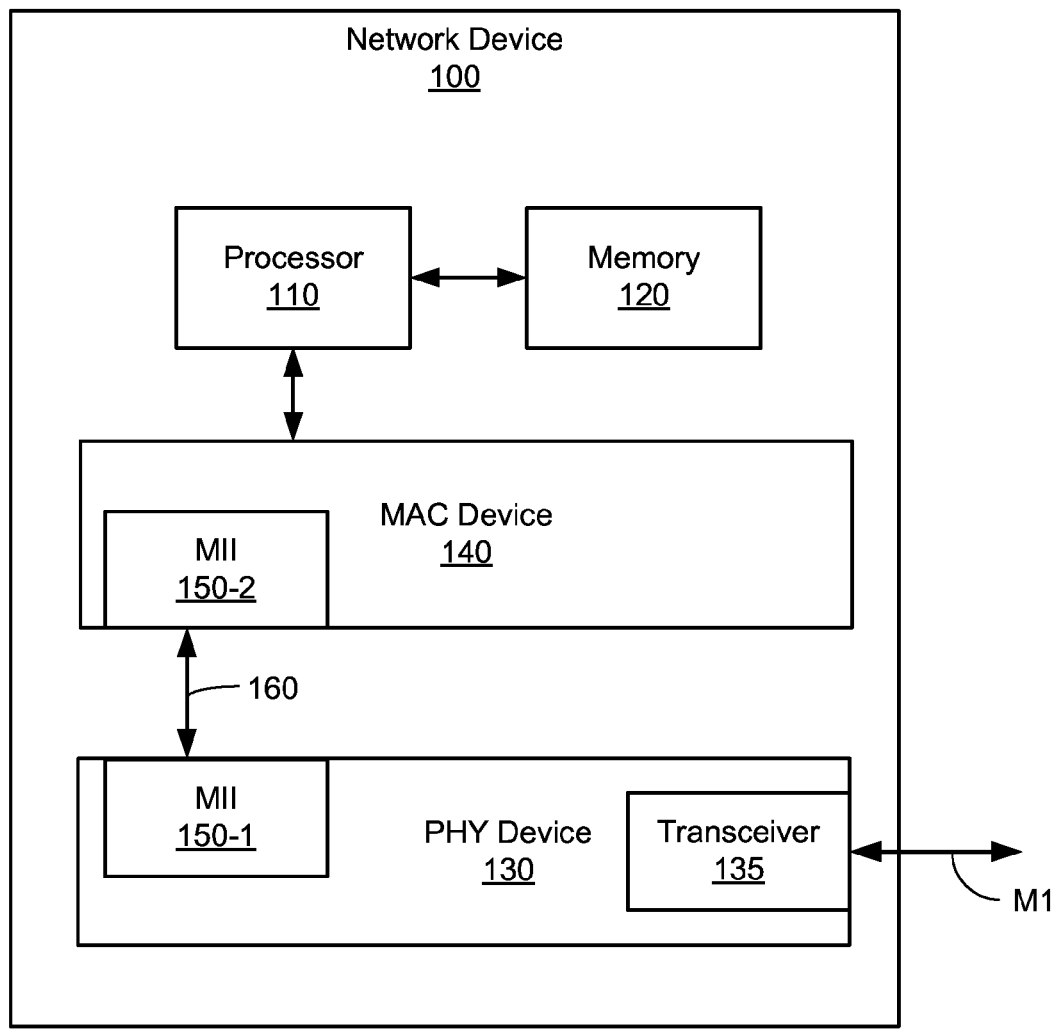
FIG. 1 is a block diagram of a network device in accordance with some embodiments.

The present embodiments are described below in the context of exchanging USB data using WLAN communication protocols for simplicity only. It is to be understood that the present embodiments are equally applicable for exchanging USB data over other suitable wireless standards. As used herein, the terms WLAN and Wi-Fi can include communications governed by the IEEE 802.11 standards, Bluetooth, HiperLAN (a set of wireless standards, comparable to the IEEE 802.11 standards, used primarily in Europe), and other technologies having relatively short radio propagation range. As used herein, the term "host device" may be used herein to refer to any USB-enabled device capable of transmitting USB data (e.g., via a wireless communications channel) to other USB-enabled devices. Further, the term "client device" may be used herein to refer to any USB-enabled device capable of receiving USB data (e.g., via a wireless communications channel) from a host device. It should be noted that, for some embodiments, a host device may also be operable as a client device, and vice-versa.

In the following description, numerous specific details are set forth such as examples of specific components, circuits, and processes to provide a thorough understanding of the present disclosure. The term "coupled" as used herein means connected directly to or connected through one or more intervening components or circuits. Also, in the following description and for purposes of explanation, specific nomenclature is set forth to provide a thorough understanding of the present embodiments. However, it will be apparent to one skilled in the art that these specific details may not be required to practice the present embodiments. In other instances, well-known circuits and devices are shown in block diagram form to avoid obscuring the present disclosure. Any of the signals provided over various buses described herein may be time-multiplexed with other signals and provided over one or more common buses. Additionally, the interconnection between circuit elements or software blocks may be shown as buses or as single signal lines. Each of the buses may alternatively be a single signal line, and each of the single signal lines may alternatively be buses, and a single line or bus might represent any one or more of a myriad of physical or logical mechanisms for communication between components. The present embodiments are not to be construed as limited to specific examples described herein but rather to include within their scopes all embodiments defined by the appended claims.

As mentioned above, it would be desirable for a host device (e.g., a computer, laptop, tablet, smartphone, etc.) to exchange USB data with one or more client devices (e.g., speakers, printers, keyboards, mice, etc.) over a corresponding WLAN. At least one of the problems associated with exchanging USB data with one or more client devices over the WLAN is synchronizing the clocks and/or counters in the client devices with the clocks and/or counters in the host device without the presence of a wired connection. For example, the USB standards define communication protocols over an associated USB cable, and typically rely upon the exchange of clock and counter information over the USB cable to ensure that the clocks and/or counters in the client devices remain synchronized with the clocks and/or counters in the host device. Thus, because WLAN communications do not use a wired connection (e.g., a USB cable), clock synchronization techniques defined by the USB standards may not be available when attempting to transmit USB data over a wireless channel associated with a WLAN.

For the disclosure herein, reference may be made to the Open System Interconnection (OSI) model, which includes 7 logical layers: layer 1 is the physical layer, layer 2 is the data link layer, layer 3 is the network layer, layer 4 is the transport layer, layer 5 is the session layer, layer 6 is the presentation layer, and layer 7 is the application layer. The higher in hierarchy an OSI layer is, the closer it is to an end user; the lower in hierarchy an OSI layer is, the closer it is to a physical channel. For example, at the top of the OSI model hierarchy is the application layer, which interacts directly with the end user's software application. At the bottom of the OSI model hierarchy is the physical layer, which defines the relationship between a network device and a physical communication medium.

The physical layer provides electrical and physical specifications for the physical medium, and includes transceivers that may modulate/de-modulate data to be transmitted/received over the medium. The data link layer provides the functional and/or procedural details, such as addressing and channel access control mechanisms, for data transmissions between devices. The data link layer includes two sub-layers: the logical link control (LLC) layer and the media access control (MAC) layer.

An interface exists between the MAC layer and the PHY layer to facilitate the exchange of information between the two layers. This interface is referred to as a media independent interface (MII) because the MAC layer is agnostic as to the physical medium used for data transmission (and thus agnostic as to the particular PHY device employed). In this manner, the MII allows a given MAC device to be used with a wide variety of PHY devices. The term MII may also refers to a specific type of media independent interface, in addition to referring to the entire genus. As used herein, the terms "media access interface" and "MII" will refer to the entire genus of such interfaces, unless otherwise noted. Examples of MIIs include Attachment Unit Interface (AUI), MII, Reduced MII, Gigabit MII (GMII), Reduced GMII, Serial GMII (SGMII), Quad SGMII (QSGMII), 10GMII, and Source Synchronous Serial MII (S3MII).

FIG. 1 is a block diagram of a network device 100 in accordance with some embodiments. Specifically, the network device 100 may be capable of communicating with another device (not shown for simplicity) via a medium M1 (e.g., a wireless channel). Network device 100 includes a processor 110, a memory 120, a PHY device 130, and a MAC device 140. PHY device 130 includes a transceiver 135 that is coupled to the wireless medium M1. Although transceiver 135 is illustrated in FIG. 1 as being included in PHY device 130, transceiver 135 may be a stand-alone device or integrated circuit. Memory 120 may be any suitable memory element or device including, for example, EEPROM or Flash memory. Processor 110 may be any suitable processor capable of executing scripts or instructions of one or more software programs stored, for example, in memory 120.

PHY device 130 and MAC device 140 each include a media independent interface (MII) 150-1 and 150-2, respectively, for transmitting signals between the two devices via a set of signal paths 160. For some embodiments, MII 150-1 may include first and second PHY-side differential transistor pairs (not shown for simplicity) for transmitting and receiving data to and from, respectively, MAC device 140, and MII 150-2 may include first and second MAC-side differential transistor pairs (not shown for simplicity) for transmitting and receiving data to and from, respectively, PHY device 130. Thus, MII 150-1 may be referred to herein as a PHY-side MII, and MII 150-2 may be referred to herein as a MAC-side MII.

MAC device 140 may be any device or integrated circuit that implements the functions of an OSI MAC sub-layer, and may be a stand-alone device or may be integrated into network device 100. Similarly, PHY device 130 may be any device or integrated circuit that implements the functions of the OSI physical layer, and may be a stand-alone device or may be integrated into network device 100.

During data transmission operations, when an end-user software application on network device 100 transmits data to another device via medium M1, processor 110 processes the data in accordance with the top layers of the OSI model and then transmits the data through MAC device 140 to PHY device 130. Then, PHY device 130 transmits the data via transceiver 135 onto medium M1.

Figure 2:
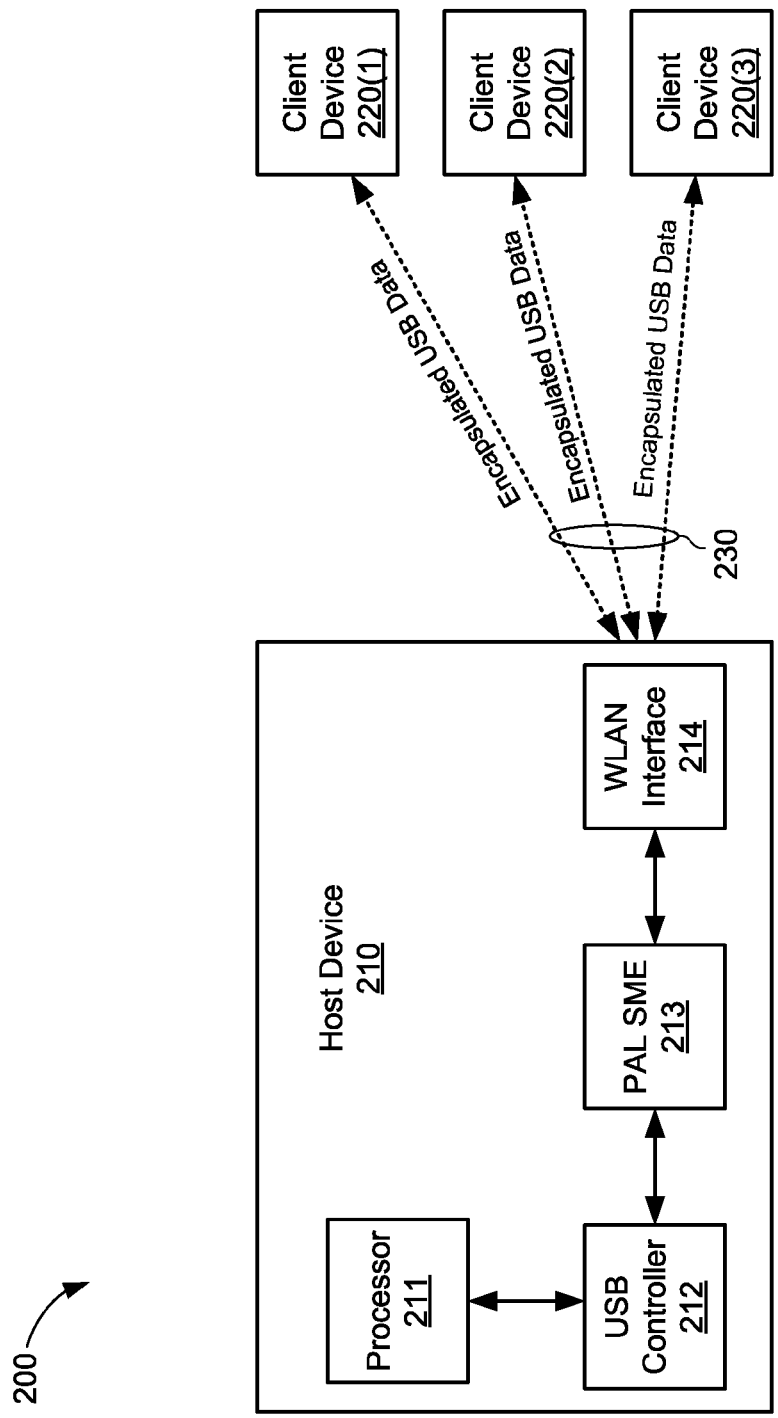
FIG. 2 shows a wireless USB communications system in accordance with some embodiments.

FIG. 2 shows a communications system 200 in accordance with some embodiments. System 200 is shown to include a host device 210 and three client devices 220(1)-220(3) that may communicate with each other using a communications channel 230. For some embodiments, the communications channel 230 may be a wireless (e.g., WLAN or Wi-Fi) channel that facilitates communications according to the IEEE 802.11 standards, although other suitable wireless communication protocols may be used. For other embodiments, the communications channel 230 may be a wired link (e.g., a 10GBASE-T Ethernet channel). Further, although three client devices 220(1)-220(3) are shown in FIG. 2 for simplicity, system 200 may include any number of client devices 220 connected to the host device 210 via the communications channel 230.

The host device 210, which may be a computer, laptop, tablet, smartphone, or other suitable computing or communication device, includes a processor 211, a USB controller 212, a protocol adaption layer (PAL) station management entity (SME) 213, and a WLAN interface 214. The processor 211 is coupled to USB controller 212, and may control operations of the USB controller 212 and/or other components of host device 210. The USB controller 212 may be any suitable USB controller capable of facilitating USB communications between processor 211 and PAL SME 213. For at least some embodiments, USB controller 212 may include or be associated with a physical coding sub-layer (PCS) circuit (not shown for simplicity) to provide encoding functions for USB communications. The PAL SME 213, which may operate according to protocols defined by the Wi-Fi Gigabit Alliance (WGA), may enable the exchange of USB data between host device 210 and the client devices 220(1)-220(3) over wireless channel 230. The WLAN interface 214, which is coupled to the PAL SME 213, may include transceivers to transmit and receive data to and from client devices 220(1)-220(3) over wireless channel 230.

The client device 220 may be any suitable USB peripheral device (e.g., a speaker, a printer, keyboard, mouse, etc.). Although not shown in FIG. 2 for simplicity, each of the client devices 220(1)-220(3) may include a processor, a USB controller, a PAL SME, and a WLAN interface to facilitate wireless exchange of USB data over wireless channel 230.

For the host device 210 to cause the client devices 220(1)-220(3) to render isochronous USB data at the correct instant in time (e.g., concurrently with one another), the USB frame counter in the host USB controller 212 should be synchronized with the USB frame counters in the client devices 220(1)-220(3). For example, if the USB data contains audio information to be played back by the client devices (e.g., acting as speakers), it may be desirable to enable playback of the audio information from a plurality of the devices 220(1)-220(3), concurrently. Accordingly, it may be desirable to synchronize the client devices 220(1)-220(3) with the host device 210 and/or with each other.

For some embodiments, the communications between the host device 210 and the client devices 220(1)-220(3) may be bidirectional. For example, each of the client devices 220(1)-220(3) may act as a host device, and the host device 210 may act as a client device, in certain instances. More specifically, the host device 210 and the client devices 220(1)-220(3) may be substantially similar computing devices that are capable of both transmitting and receiving USB frames via a wireless communications channel (e.g., wireless channel 230).

Figure 3:
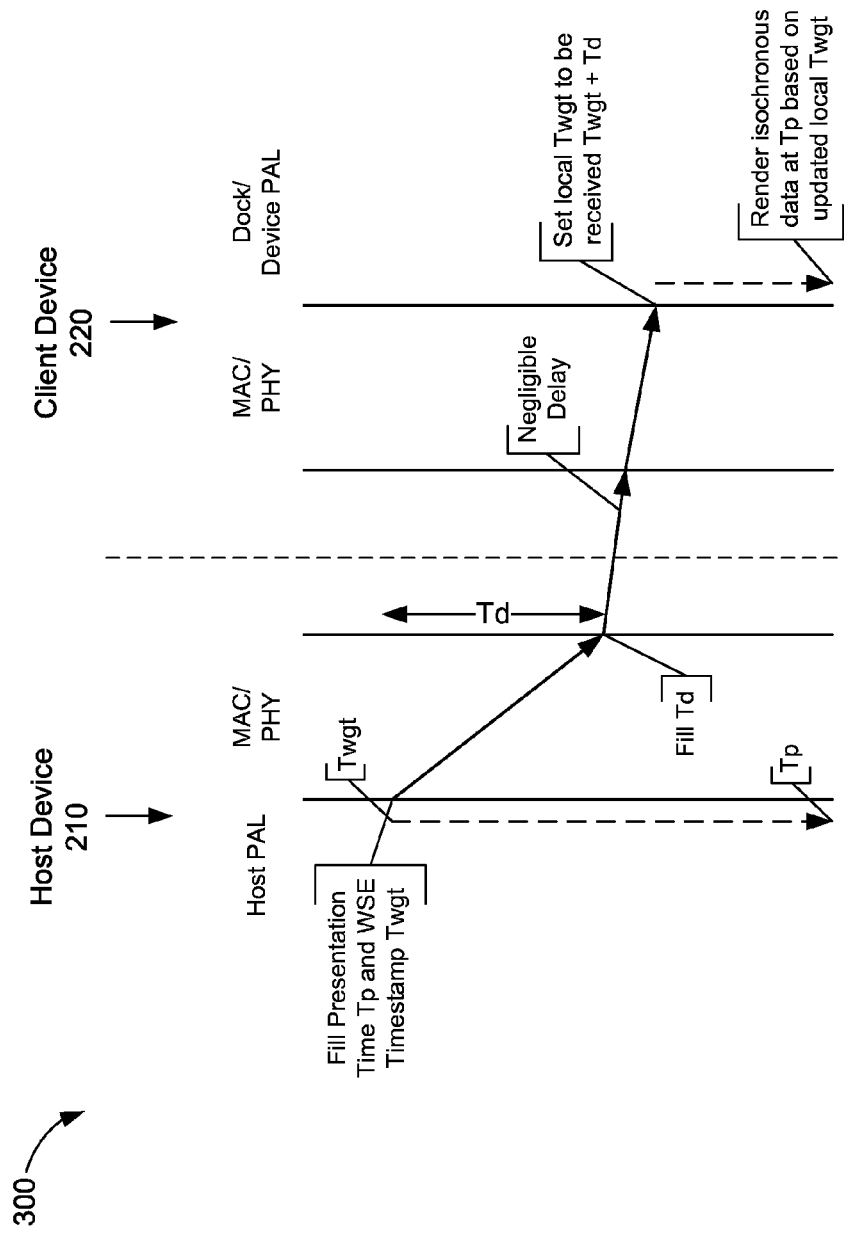
FIG. 3 is an illustrative timing diagram that depicts potential problems with wirelessly synchronizing USB client devices with a host device.

FIG. 3 is an illustrative timing diagram 300 that depicts potential problems with synchronizing client devices 220(1)-220(3) with host device 210. Referring also to FIG. 2, when the USB controller 212 receives data from the processor 211, the USB controller 212 may attach a timestamp (Tp) to the data and encapsulate the data into a packet for subsequent transmission to client devices 220(1)-220(3). However, there may be a transmission delay (Td) between the MAC and PHY layers (e.g., between USB controller 212 and WLAN interface 214) of host device 210. This transmission delay, which may not be constant for different data packets, may cause timing errors associated with one or more of client devices 220(1)-220(3) receiving, processing, and/or displaying data packets transmitted from host device 210.

One solution to this timing problem may involve parsing the data packet in the host device 210, extracting the original timestamp (Tp), calculating the transmission delay (Td), and then updating the original timestamp to reflect the transmission delay. This process, which may involve deep packet inspection (DPI) operations within the host device 210, consumes valuable processing resources, and may be time consuming. Further, many existing host devices may not include circuitry or software modules capable of performing DPI operations on USB data packets/frames received from the USB controller 212.

For some embodiments, the host device 210 and/or client devices 220(1)-220(3) may utilize WLAN operations defined by the IEEE 802.11 standards to synchronize the client devices 220(1)-220(3) with the host device 210. More specifically, the host device 210 may employ techniques embodied by the IEEE 802.11 standards to ensure that the counters and/or clocks of the client devices 220(1)-220(3) are synchronized (and remain synchronized) with respective counters and/or clocks of the host device 210. For example, FIGS. 4A-4B are sequence diagrams depicting an exemplary wireless USB synchronization operation in accordance with some embodiments.

Figure 4A:
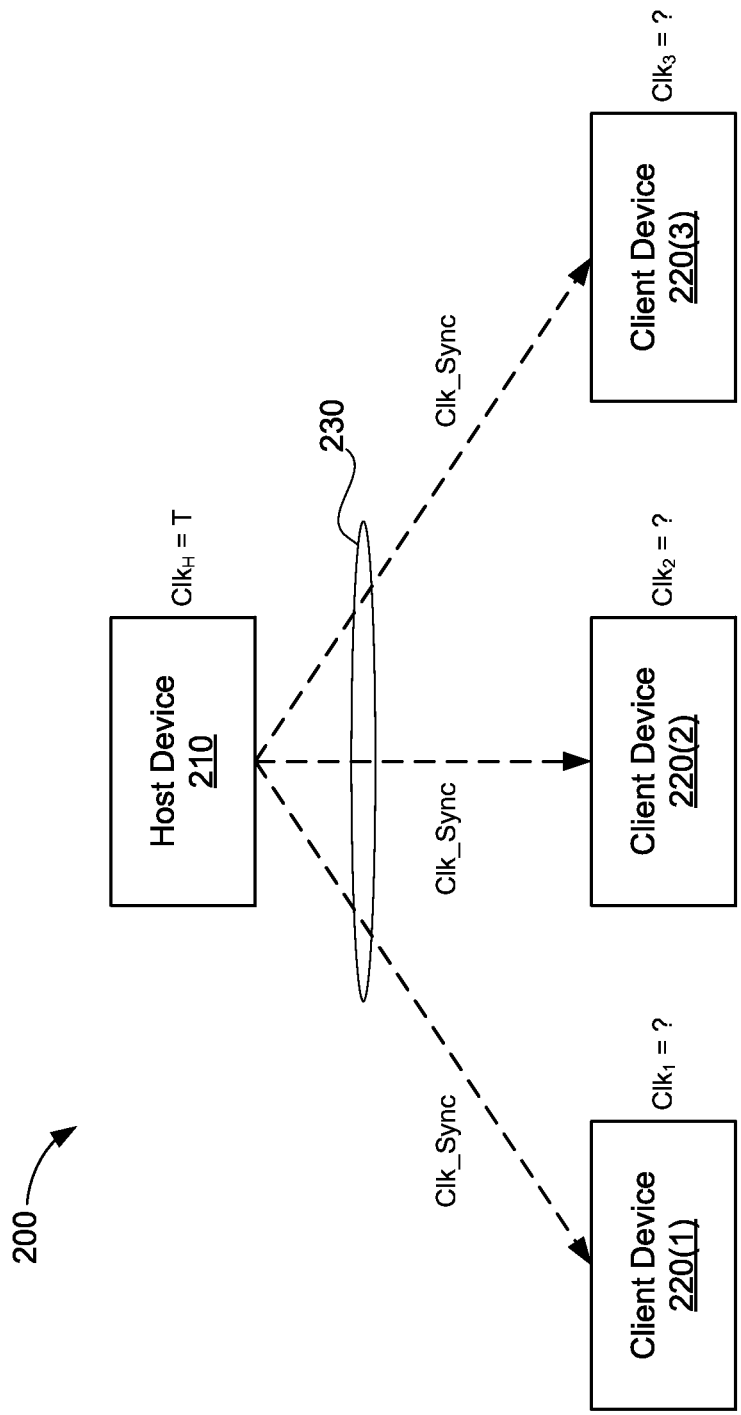
FIGS. 4A-4B are sequence diagrams depicting an exemplary wireless USB synchronization operation in accordance with some embodiments.
Figure 4B:
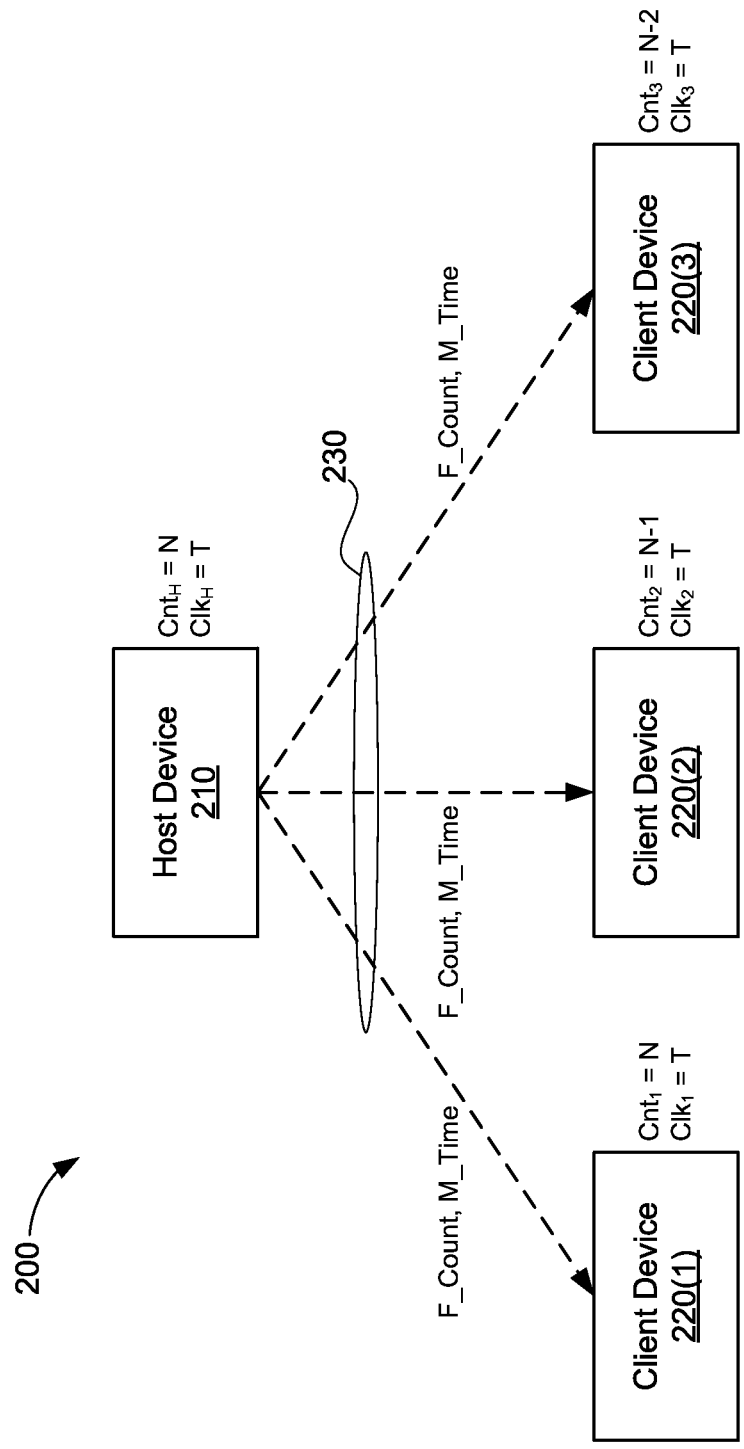

With reference, for example, to FIG. 4A, the host device 210 generates an internal clock signal ($Clk_H$) that may be used to time a transmission (and/or reception) of data to (and/or from) the client devices 220(1)-220(3). Similarly, each of the client devices 220(1)-220(3) may generate a corresponding local clock signal ($Clk_1$-$Clk_3$) that may be used to time a reception (and/or transmission) of data from (and/or to) the host device 210. For some embodiments, the host device 210 may transmit clock synchronization (Clk_Sync) data to each of the client devices 220(1)-220(3) for purposes of synchronizing the local clock signals $Clk_1$-$Clk_3$ with the host clock signal $Clk_H$. Each of the client devices 220(1)-220(3) may then use the Clk_Sync data to align its local clock with the host clock $Clk_H$ (e.g., by applying respective timing offsets to the local clocks $Clk_1$-$Clk_3$).

For some embodiments, the clock synchronization operation may be performed using one or more clock synchronization mechanisms or techniques that are already provided by a communications protocol associated with the communications channel 230. For example, the host clock signal $Clk_H$ and local clock signals $Clk_1$-$Clk_3$ may be generated based on a timing synchronization function (TSF) defined by the IEEE 802.11 wireless protocols. Alternatively, and/or in addition, the host clock signal $Clk_H$ may be synchronized with the local clock signals $Clk_1$-$Clk_3$ using other clock synchronization techniques (e.g., such as those defined by the 802.1AS, 802.11v, and/or 802.11mc standards), depending on the level of accuracy desired for a particular application.

A TSF timer may be a modulus $2^{64}$ counter that increments (e.g., "ticks") in micro-seconds, and thus has a maximum count value of $2^{64}$=102,400 micro-seconds (although other suitable timers, clocks, and/or counters may be used). For some embodiments, the host device 210 may broadcast its TSF timer value to the client devices 220(1)-220(3) in one or more beacon frames. Upon receiving a beacon frame, each of the client devices 220(1)-220(3) may set its own local TSF timer to the received TSF timer value. This ensures that the local TSF timers of the client devices 220(1)-220(3) (e.g., $Clk_1$-$Clk_3$) are synchronized with a TSF timer of the host device 210 (e.g., $Clk_H$).

For some embodiments, the Clk_Sync data may be broadcast and/or transmitted periodically to maintain clock synchronization between the host device 210 and the client devices 220(1)-220(3). For example, where the communications channel 230 is a Wi-Fi channel, the 802.11 specification defines a clock synchronization mechanism wherein the host device 210 periodically broadcasts beacon frames to the client devices 220(1)-220(3). Accordingly, the client devices 220(1)-220(3) and the host device 210 may establish a series of target beacon transmission times (TBTT) that are spaced apart by a beacon interval (e.g., provided within the beacon frame). The client devices 220(1)-220(3) may then resynchronize their local TSF timers with the TSF timer of the host device 210 each time a new beacon frame is received.

Once the local clock signals $Clk_1$-$Clk_3$ are synchronized with the host clock signal $Clk_H$, the host device 210 may then begin transmitting encapsulated USB frames to the client devices 220(1)-220(3) via the communications channel 230. For example, the USB frames may correspond to USB data that would otherwise be transmitted to one or more of the client devices 220(1)-220(2) via a USB cable. Instead, for some embodiments, the USB frames may be encapsulated in (e.g., written to and/or carried by) one or more data packets, based on a wireless communications protocol, to be transmitted via the communications channel 230. The client devices 220(1)-220(3) may decapsulate the received data packets to recover the original USB frames. For some embodiments, each of the client devices 220(1)-220(3) may update a local frame counter (e.g., $Cnt_1$-$Cnt_3$) for each USB frame received from the host device 210.

With reference, for example, to FIG. 4B, the host device 210 may transmit information identifying a frame count value (F_Count) and a media time (M_Time) associated with the count value to the client devices 220(1)-220(3) to synchronize a frame counter $Cnt_H$ of the host device 210 with the local frame counters $Cnt_1$-$Cnt_3$ of the client devices 220(1)-220(3), respectively. The frame counter $Cnt_H$ may indicate a number of USB frames transmitted by the host device 210. For example, the host device 210 may update the frame counter $Cnt_H$ for each USB frame transmitted to the client devices 220(1)-220(3).

The F_Count value may indicate the total number of USB frames transmitted by the host device 210 (e.g., based on the host frame counter $Cnt_H$) at any given time. More specifically, the M_Time value may specify the particular time (e.g., based on the host clock signal $Clk_H$) at which the F_Count value was determined and/or embedded within an outgoing data packet and/or USB frame. For some embodiments, the M_Time value may correspond to a transmit timestamp (e.g., as defined by the 802.11 specification) that is embedded within each data packet and/or frame transmitted by the host device 210. For some embodiments, the F_Count and M_Time values may be encoded at substantially the same time and thus "mated" to one another. For example, the F_Count and M_Time values may be encapsulated in one or more USB frames and provided with other encapsulated USB data. Alternatively, the F_Count and M_Time values may be transmitted separately from the USB data (e.g., as part of an independent management frame).

Each of the local frame counters $Cnt_1$-$Cnt_3$ may be synchronized with the host frame counter $Cnt_H$ based on the F_Count value, the M_Time value, and a corresponding local clock signal $Clk_1$-$Clk_3$, respectively. For example, a frame count synchronization operation may be performed for any client device 220 based on the following equation:

$$Cnt_n = \text{F\_Count} + (Clk_n - \text{M\_Time}) * \left(\frac{USB \text{ Frames}}{\text{Clock Cycle}}\right) \quad (1)$$

Thus, after synchronizing each of the local clock signals $Clk_1$-$Clk_3$ with the host clock signal $Clk_H$ (e.g., as described above with respect to FIG. 4A), the amount of time elapsed between the encoding of the F_Count value by the host device 210 and its reception by one of the client devices 220(1)-220(3) may be determined by taking the time at which the F_Count value is received (e.g., based on the local clock signals $Clk_1$-$Clk_3$) and subtracting the M_Time value. The number of additional USB frames that are likely to have been transmitted by the host device 210 during this elapsed time may be determined by multiplying the elapsed time by the transmission rate of the host device 210 (e.g., the total number of USB frames that can be transmitted per clock cycle). The result can then be added to the F_Count value to determine the current count value of the host counter $Cnt_H$.

The client devices 220(1)-220(3) may then update their respective local counters $Cnt_1$-$Cnt_3$ based on subsequently received USB frames. It should be noted, however, that the rate at which individual client devices 220(1)-220(3) receive USB frames may vary. For example, due to delays in the transmission of data by the host device 210, propagation delays along the communications channel 230, and/or multipath conditions, each of the client devices 220(1)-220(3) may receive USB frames at different times. Thus, at any given time, the number of USB frames buffered by one of the client devices 220(1)-220(3) may be different than the number of USB frames buffered by another client device. For example, at a particular time T, the host counter $Cnt_H$ may have a count value of N, local counter Cnt1 may store a count value of N, local counter $Cnt_2$ may store a count value of N−1, and local counter $Cnt_3$ may store a count value of N−2. For some embodiments, the host device 210 may periodically transmit new F_Count and M_Time values to the client devices 220(1)-220(3) in order to maintain synchronization between the host counter $Cnt_H$ and each of the local counters $Cnt_1$-$Cnt_3$. This allows each of the local frame counters $Cnt_1$-$Cnt_3$ to maintain a count of the total number of frames transmitted by the host device 210, and not just the number of USB frames received and/or buffered by a respective one of the client devices 220(1)-220(3).

For some embodiments, the host device 210 may transmit a processing request message to one or more of the client device 220(1)-220(3) with instructions to begin processing and/or rendering received USB frames based on a particular frame count. For example, each of the client devices 220(1)-220(3) may include an internal storage element that buffers USB frames received from the host device 210. The client devices 220(1)-220(3) may continue buffering USB frames until they are instructed by the host device 210 to begin processing or rendering the buffered USB frames. For some embodiments, the processing request message may instruct the client devices 220(1)-220(3) to begin processing the USB frames after a local frame counter reaches a particular frame count threshold. However, as described above, the local frame counters $Cnt_1$-$Cnt_3$ may drift with respect to the host counter $Cnt_H$. It may nonetheless be desirable for each of the client devices 220(1)-220(3) to begin processing or rendering stored USB frames at substantially the same time (e.g., as in the case where each of the client devices 220(1)-220(3) is a speaker configured to playback the same audio signal). Thus, synchronizing each of the local frame counters $Cnt_1$-$Cnt_3$ with the host counter $Cnt_H$ may enable multiple client devices 220(1)-220(3) to begin processing USB concurrently.

By leveraging existing clock protocols provided for the communication channel 230, the system 200 may efficiently and accurately maintain a synchronized USB frame count between the host device 210 and the client devices 220(1)-220(3) without requiring deep packet inspection. Moreover, in accordance with the present embodiments, each of the client devices 220(1)-220(3) may determine the current frame count of the host device 210, using the F_Count and M_Time values, even if the client devices 220(1)-220(3) receive such values at different times.

Figure 5:
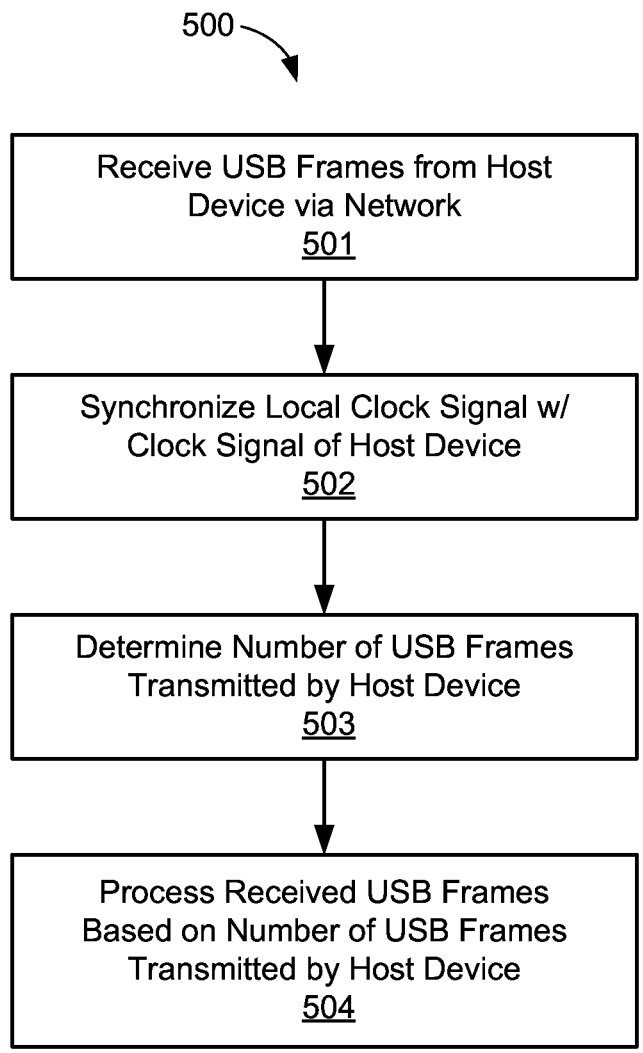
FIG. 5 is an illustrative flow chart depicting an exemplary method of operating a USB client device in accordance with some embodiments.

FIG. 5 is an illustrative flow chart depicting an exemplary method 500 of operating a USB client device in accordance with some embodiments. For example, the method 500 may be implemented by any of the client devices 220 described above, with respect to FIGS. 2 and 4A-4B. Specifically, a client device 220 may receive one or more USB frames from host device 210 via a network (501). For some embodiments, the one or more USB frames may be encapsulated in one or more data packets based on a communications protocol associated with the network. The client device 220 may decapsulate the received data packets to recover the one or more USB frames. Further, for some embodiments, the client device 220 may store the received USB frames in a data buffer.

The client device 220 further synchronizes its local clock signal with a clock signal of the host device (502). Specifically, the client device 220 may synchronize its local clock signal with the host clock signal based on a clock synchronization mechanism of the communications protocol. For example, the host device 210 may periodically transmit or broadcast clock synchronization (Clk_Sync) data which may be used by the client device 220 to adjust its local clock signal. In an 802.11 wireless network, the clock synchronization data may correspond to a TSF value broadcast by the host device 210 in one or more beacon frames. The client device 220 may then adjust its own TSF value (if necessary) to match the TSF value of the host device 210 (e.g., as described above with respect to FIG. 4A).

The client device 220 then determines a number of USB frames transmitted by the host device 210 (503). Specifically, the client device 220 may determine the number of USB frames transmitted by the host device 210 based on the synchronized local clock signal. For example, the client device 220 may update a local frame counter for each USB frame received from the host device 210. However, as described above, the number of USB frames received by the client device 220 may not always match the number of USB frames transmitted by the host device 210 (e.g., due to drift and/or dropped data packets). Thus, for some embodiments, the local frame counter may track a USB frame counter in the host device 210 based on synchronization data transmitted by the host device 210. The synchronization data may include, for example, a frame count (F_Count) value and a media time (M_Time) value. More specifically, the F_Count value may indicate the number of USB frames transmitted by the host device 210 at a time specified by the M_Time value. The client device 220 may then use the synchronized local clock signal to determine the number of additional USB frames transmitted since the time indicated by the M_Time value (e.g., as described above, with respect to FIG. 4B). For some embodiments, the client device 220 may periodically resynchronize its local frame counter with that of the host device 210.

Finally, the client device 220 may process the received USB frames based on the number of USB frames transmitted by the host device 210 (504). For example, the host device 210 may instruct the client device 220 to begin processing and/or rendering the received USB frames once the local frame counter reaches a particular frame count threshold. Because the local frame counter may be synchronized with the host frame counter, the client device 220 may begin processing USB frames at any time indicated by the host device 210. This may allow multiple client devices 220 to begin processing USB frames at substantially the same time, regardless of the number of USB frames actually received by each client device 220 at that time.

Figure 6:
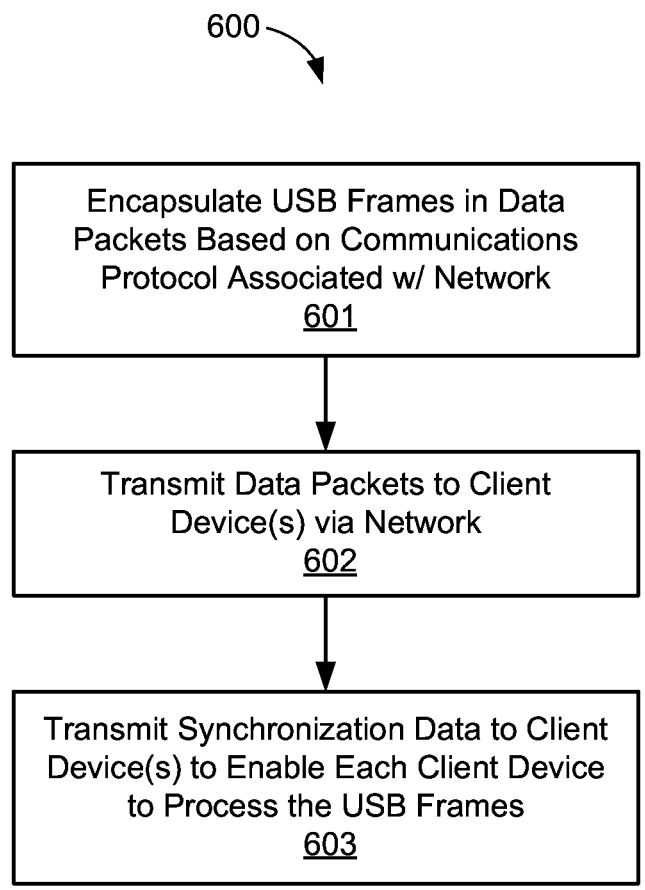
FIG. 6 is an illustrative flow chart depicting an exemplary method of operating a USB host device in accordance with some embodiments.

FIG. 6 is an illustrative flow chart depicting an exemplary method 600 of operating a USB host device in accordance with some embodiments. For example, the method 600 may be implemented by the host device 210 described above, with respect to FIGS. 2 and 4A-4B. Specifically, a host device 210 on a network may encapsulate USB frames in data packets based on a communications protocol associated with the network (601). As described above, the USB frames may correspond to USB data that would otherwise be transmitted to one or more client devices 220 via a USB cable. The host device 210 may encapsulate the USB frames, for example, by embedding corresponding USB data within one or more data packets to be transmitted via a particular type of communications channel.

The host device 210 may then transmit the data packets, including the encapsulated USB frames, to one or more client devices 220 via the network (602). For example, the network may correspond to a Wi-Fi network defined by an IEEE 802.11 standard. Accordingly, the host device 210 may transmit the data packets to one or more client devices 220 based on one or more 802.11 wireless protocols. For some embodiments, the host device 210 may transmit the data packets to multiple client devices 220, concurrently. Further, for some embodiments, the host device 210 may include a USB frame counter to keep track of the number of USB frames transmitted to the one or more client devices 220. For example, the host device 210 may update its USB frame counter for each USB frame transmitted.

The host device 210 may further transmit a set of synchronization data to the one or more client devices 220 to enable each client device 220 to process the USB frames (603). The synchronization data may include, for example, clock synchronization (Clk_Sync) data, a frame count (F_Count) value, and/or a media time (M_Time) value. More specifically, the Clk_Sync data may be used to synchronize a clock signal of the host device 210 with a local clock signal of the one or more client devices 220 (e.g., as described above, with respect to FIG. 4A). For some embodiments, the Clk_Sync data may be provided by a clock synchronization mechanism associated with the wireless communications protocol. The F_Count and M_Time values may be used to synchronize the USB frame counter of the host device 210 with a local frame counter of the one or more client devices 220 (e.g., as described above, with respect to FIG. 4B). As described above, the F_Count value may indicate the number of USB frames transmitted by the host device 210 at a time specified by the M_Time value. For some embodiments, the host device 210 may periodically transmit updated synchronization data to maintain synchronization with each of the one or more client devices 220.

Figure 7:
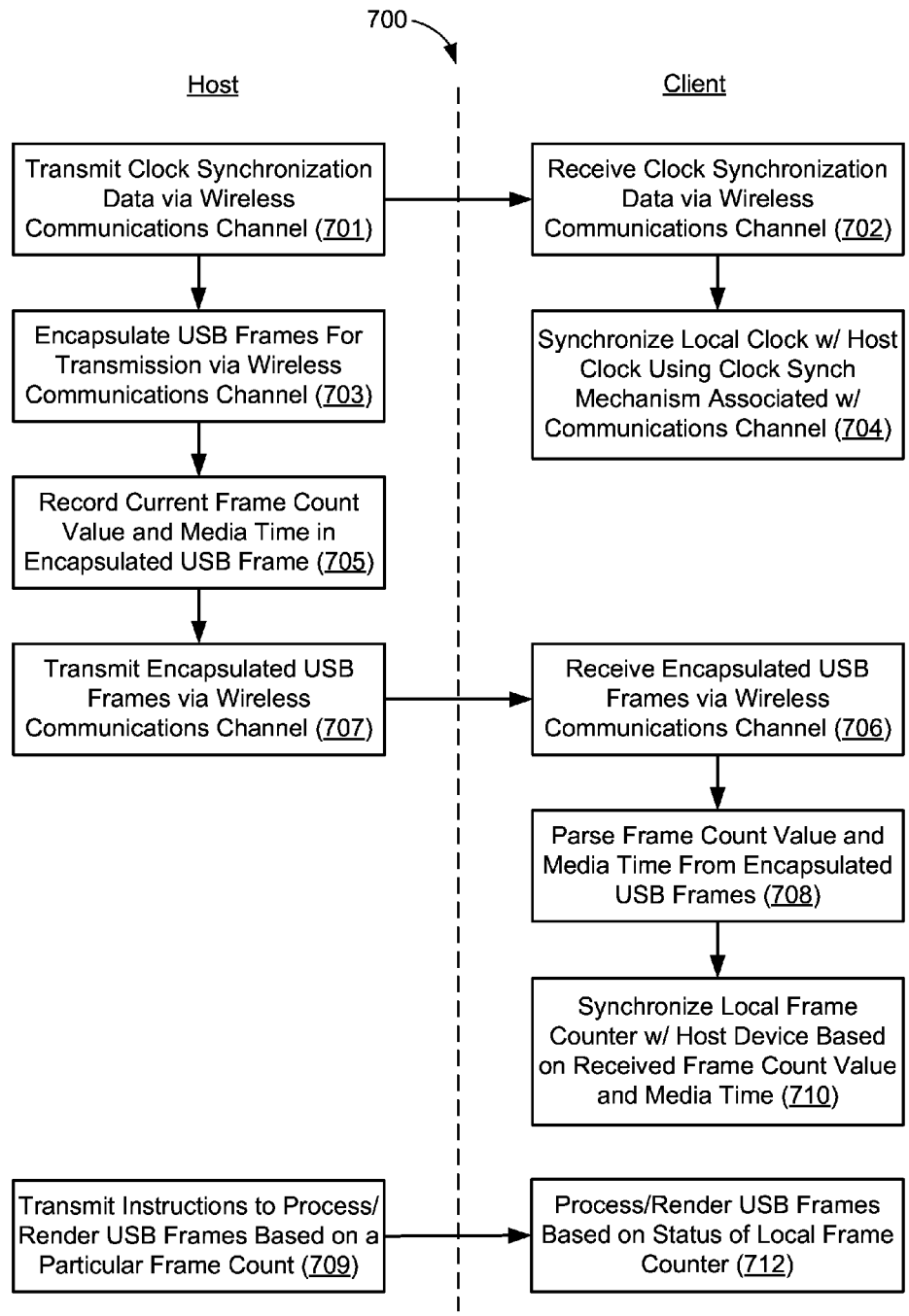
FIG. 7 is an illustrative flow chart depicting a wireless USB synchronization operation in accordance with some embodiments.

FIG. 7 is an illustrative flow chart depicting a wireless USB synchronization operation 700 in accordance with some embodiments. With reference, for example, to FIGS. 4A-4B, the host device 210 first transmits clock synchronization data to a client device (e.g., client device 220(1)) via the wireless communications channel 230 (701). For some embodiments, the clock synchronization data may correspond to a TSF timer value provided within a beacon frame. The client device 220(1) receives the clock synchronization data via the wireless communications channel 230 (702), and synchronizes its local clock signal $Clk_1$ with the host clock signal $Clk_H$ using a clock synchronization mechanism associated with the communications channel 230 (704). For example, the client device 220(1) may use the host device's TSF timer value to synchronize its local clock signal $Clk_1$ (e.g., as described above with respect to FIG. 4A).

The host device 210 encapsulates USB frames for transmission via the wireless communications channel 230 (703). For example, with reference to FIG. 2, the PAL SME 213 may encapsulate USB frames (e.g., received via the USB controller 212) in accordance with a Wi-Fi protocol, to be transmitted via a Wi-Fi channel. For some embodiments, the encapsulation may be performed according to WGA protocols. The host device 210 embeds the current frame count and media time values in the encapsulated USB frame (705). For example, the F_Count value may be recorded from the host frame counter $Cnt_H$, and the corresponding M_Time value may be recorded from the host clock signal $Clk_H$. For some embodiments, the F_Count and M_Time values are mated together and recorded at substantially the same time. Finally, the host device 210 transmits the encapsulated USB frames to the client device 220(1) via the wireless communications channel 230 (707).

The client device 220(1) receives the encapsulated USB frames via the wireless communications channel (706), and parses the F_Count and M_Time values provided therewith (708). For some embodiments, the client device 220(1) may parse the F_Count and M_Time values from a received data packet without decapsulating the USB data. The client device 220(1) then synchronizes its local frame counter $Cnt_1$ with the host frame counter $Cnt_H$ based on the received F_Count and M_Time values and the synchronized local clock signal $Clk_1$ (710). For example, the client device 220(1) may update its local frame counter $Cnt_1$ based on Equation 1 (e.g., as described above with respect to FIG. 4B).

For some embodiments, the host device 210 may subsequently issue an instruction to process and/or render USB frames beginning at a particular frame count (709). For example, the frame count, as specified by the host device 210, may correspond with a count value of the host frame counter $Cnt_H$. Upon receiving such instruction, the client device 220(1) may proceed to process and/or render buffered USB frames based on its local frame counter $Cnt_1$ (712). Specifically, because the local frame counter $Cnt_1$ is synchronized with the host frame counter $Cnt_H$ the client device 220(1) may begin processing its buffered USB data at the desired time, regardless of the number of USB frames actually received and/or buffered by the client device 220(1).

For simplicity, the foregoing synchronization operation 700 has been described with respect to the client device 220(1), for simplicity only. However, the operation 700 may be performed in a substantially similar manner between the host device 210 and any of the client devices 220(1)-220(3). Further, the synchronization operation 700 may ensure that USB data packets transmitted to multiple client devices 220(1)-220(3) via the wireless channel 230 are played and/or rendered (e.g., output from speakers associated with client devices 220(1)-220(3)) at the correct times (e.g., synchronously).

Figure 8:
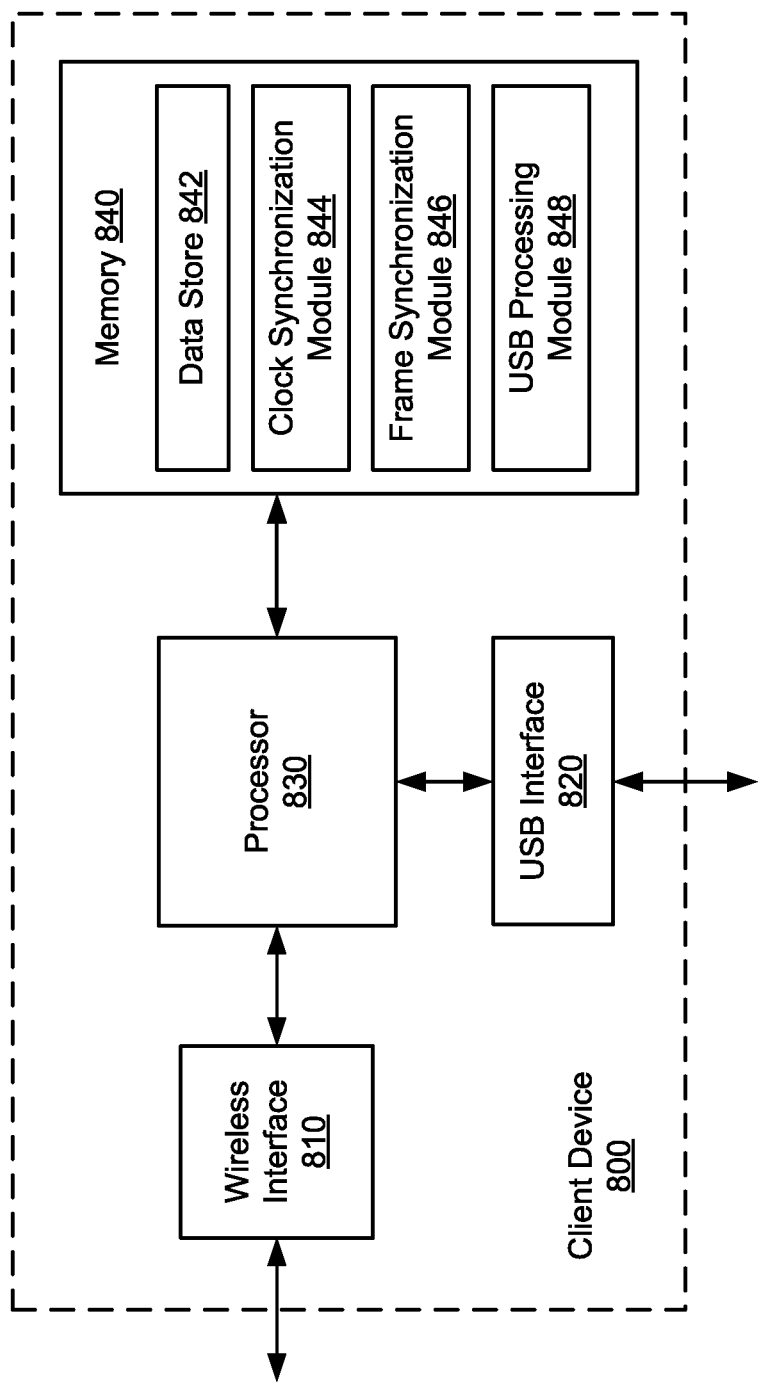
FIG. 8 is a block diagram of a USB-enabled client device in accordance with some embodiments.

FIG. 8 is a block diagram of a USB-enabled client device 800 in accordance with some embodiments. The client device 800 includes a wireless interface 810, a USB interface 820, a processor 830, and a memory 840. The wireless interface 810 is coupled to the processor 830 and may be used to receive and/or transmit data signals via a wireless communications channel. For example, the wireless communications channel may correspond to an IEEE 802.11 wireless channel. The USB interface 820 is also coupled to the processor 830, and may be used to communicate USB data to and/or from the client device 800 (e.g., via a USB cable). For some embodiments, the wireless interface 810 may receive USB frames, encapsulated in data packets, which would otherwise be received via the USB interface 820.

Memory 840 may include a data store 842 that may be used to buffer USB frames to be processed and/or played back by the device 800. For example, USB frames received via the wireless interface 810 may be stored in the data store 842. Furthermore, memory 840 may also include a non-transitory computer-readable storage medium (e.g., one or more nonvolatile memory elements, such as EPROM, EEPROM, Flash memory, a hard drive, etc.) that can store the following software modules:

- a clock synchronization module 844 to synchronize a local clock signal with a clock signal of a host device;
- a frame synchronization module 846 to synchronize a local frame counter with a USB frame counter of a host device; and
- a USB processing module 848 to process received USB frames based on a frame count value of the local frame counter.

Each software module may include instructions that, when executed by the processor 830, may cause the device 800 to perform the corresponding function. Thus, the non-transitory computer-readable storage medium of memory 840 may include instructions for performing all or a portion of the operations described with respect to FIGS. 5 and 7.

The processor 830, which is coupled to the memory 840, may be any suitable processor capable of executing scripts of instructions of one or more software programs stored in the client device 800 (e.g., within memory 840). For example, the processor 830 may execute the clock synchronization module 844, the frame synchronization module 846, and/or the USB processing module 848.

The clock synchronization module 844 may be executed by the processor 830 to synchronize a local clock signal with a clock signal of a host device. For example, the client device 800 may receive clock synchronization (Clk_Sync) data from a host device via the wireless interface 810. For some embodiments, the Clk_Sync data may correspond to a TSF value that is periodically broadcast by the host device (e.g., in beacon frames). The clock synchronization module 844, as executed by the processor 830, may synchronize its local clock signal with a host clock signal by setting its own local TSF timer to the received TSF value (e.g., as described above with respect to FIG. 4A).

The frame synchronization module 846 may be executed by the processor 830 to synchronize a local frame counter with a USB frame counter of a host device. For example, the client device 800 may further receive a frame count (F_Count) value and a media time (M_Time) value from the host device via the wireless interface 810. As described above, the F_Count value may indicate a number of USB frames transmitted by the host device at a particular time indicated by the M_Time value. The frame synchronization module 846, as executed by the processor 830, may synchronize its local frame counter with the host frame counter based on the F_Count and M_Time values, the local clock signal, and the transmission rate of the host device (e.g., as described above with respect to FIG. 4B). For some embodiments, the processor 830, in executing the frame synchronization module 846, may continuously update (e.g., increment) the local frame counter for reach USB frame received form the host device.

The USB processing module 848 may be executed by the processor 830 to process the received USB frames based on a frame count value of the local frame counter. For example, the USB processing module 848, as executed by the processor 830, may begin processing USB frames stored in the data store 842 once the local frame counter reaches a particular frame count threshold. For some embodiments, the frame count threshold may be specified by the host device (e.g., by transmitting a processing request message to the client device 800). Because the local frame counter may be synchronized with the host frame counter, the processor 830, in executing the USB processing module 848, may begin processing USB frames at any time indicated by the host device.

Figure 9:
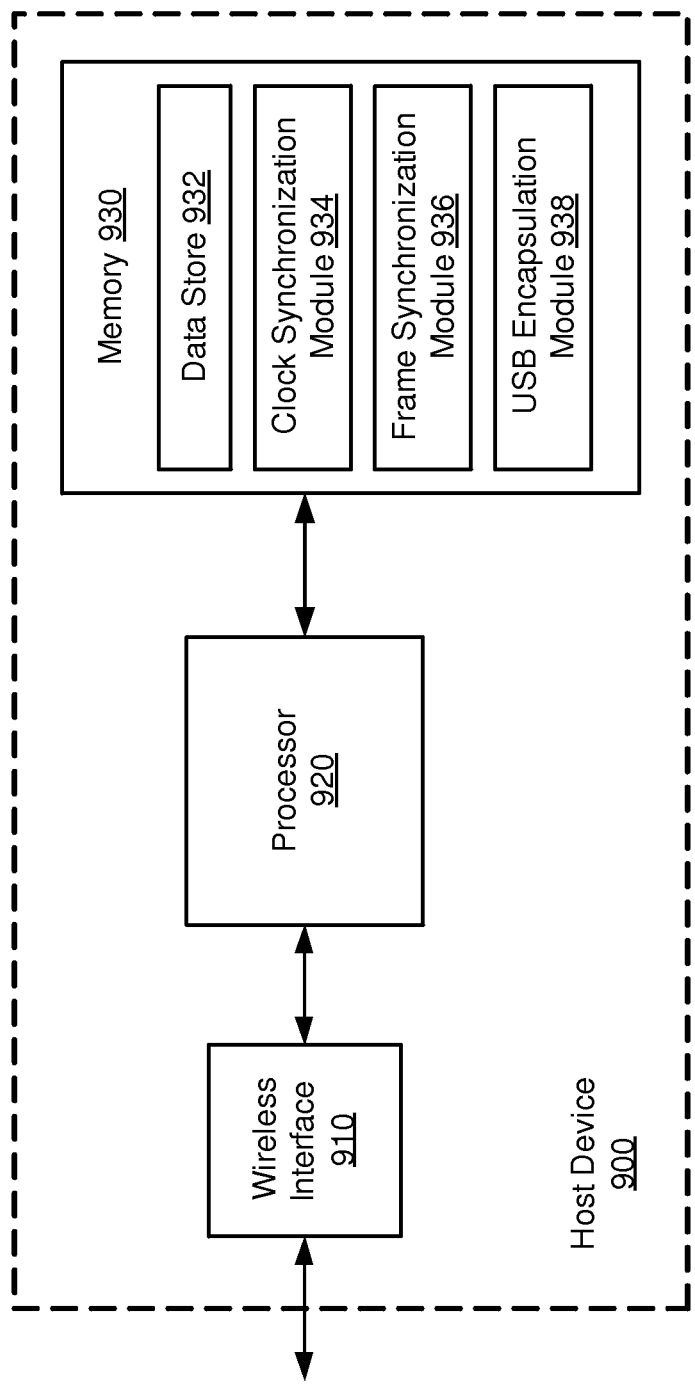
FIG. 9 is a block diagram of a USB-enabled host device in accordance with some embodiments.

FIG. 9 is a block diagram of a USB-enabled host device 900 in accordance with some embodiments. The host device 900 includes a wireless interface 910, a processor 920, and a memory 930. The wireless interface 910 is coupled to the processor 920 and may be used to transmit and/or receive data signals via a wireless communications channel. For example, the wireless communications channel may correspond to an IEEE 802.11 wireless channel. For some embodiments, the wireless interface 910 may wirelessly transmit USB frames encapsulated in data packets.

Memory 930 may include a data store 932 that may be used to buffer USB frames to be encapsulated and transmitted to one or more client devices. Furthermore, memory 930 may also include a non-transitory computer-readable storage medium (e.g., one or more nonvolatile memory elements, such as EPROM, EEPROM, Flash memory, a hard drive, etc.) that can store the following software modules:

- a clock synchronization module 934 to synchronize a host clock signal with a local clock signal of a client device;
- a frame synchronization module 936 to synchronize a host frame counter with a local frame counter of the client device; and
- a USB encapsulation module 938 to encode USB frames into data packets for transmission via the wireless interface 910.

Each software module may include instructions that, when executed by the processor 920, may cause the device 900 to perform the corresponding function. Thus, the non-transitory computer-readable storage medium of memory 930 may include instructions for performing all or a portion of the operations described with respect to FIGS. 6 and 7.

The processor 920, which is coupled to the memory 930, may be any suitable processor capable of executing scripts of instructions of one or more software programs stored in the host device 900 (e.g., within memory 930). For example, the processor 920 may execute the clock synchronization module 934, the frame synchronization module 936, and/or the USB processing module 938.

The clock synchronization module 934 may be executed by the processor 920 to synchronize a host clock signal with a local clock signal of a client device. For example, the clock synchronization module 934, as executed by the processor 920, may generate clock synchronization (Clk_Sync) data to be transmitted to one or more client devices via the wireless interface 910. For some embodiments, the Clk_Sync data may correspond to a TSF value based on a TSF timer of the host device 900 (e.g., defined by an IEEE 802.11 specification). Each of the one or more client devices may then synchronize its local clock signal with the host clock signal using the Clk_Sync data (e.g., as described above with respect to FIG. 4A). For some embodiments, the processor 920, in executing the clock synchronization module 934, may periodically broadcast the Clock_Sync data (e.g., within beacon frames) to multiple client devices, concurrently.

The frame synchronization module 936 may be executed by the processor 920 to synchronize a host frame counter with a local frame counter of the client device. For example, the frame synchronization module 936, as executed by the processor 920, may generate a frame count (F_Count) value and a media time (M_Time) value to be transmitted to the one or more client devices via the wireless interface 910. For some embodiments, the F_Count value may correspond to the count value of the host frame counter at a particular time indicated by the M_Time value. Each of the one or more client devices may then synchronize its local frame counter with the host frame counter based on the F_Count and M_Time values, the local clock signal, and the transmission rate of the host device (e.g., as described above with respect to FIG. 4B). For some embodiments, the processor 920, in executing the frame synchronization module 936, may continuously update (e.g., increment) the host frame counter for each USB frame transmitted to the one or more client devices.

The USB processing module 938 may be executed by the processor 920 to encode USB frames into data packets for transmission via the wireless interface 910. For example, the USB processing module 938, as executed by the processor 920, may encapsulate the USB frames by writing corresponding USB data to one or more data packets to be transmitted wirelessly. For some embodiments, the encapsulation may be performed according to WGA protocols. Further, for some embodiments, the processor 920, in executing the USB processing module 938, may generate a processing request message to be transmitted, along with the USB frames, to the one or more client devices. As described above, the processing request message may include instructions for processing the corresponding USB frames (e.g., based on a particular USB frame count).

It should be noted that, for some embodiments, the client device 800 may perform one or more functions of the host device 900, and vice-versa. For example, the client device 800 may include one or more software modules (e.g., 934-938) of the host device 900. Similarly, the host device 900 may include one or more software modules (e.g., 844-848) of the client device 800.

In the foregoing specification, the present embodiments have been described with reference to specific exemplary embodiments thereof. It will, however, be evident that various modifications and changes may be made thereto without departing from the broader scope of the disclosure as set forth in the appended claims. The specification and drawings are, accordingly, to be regarded in an illustrative sense rather than a restrictive sense. For example, the method steps depicted in the flow charts of FIGS. 5-7 may be performed in other suitable orders, multiple steps may be combined into a single step, and/or some steps may be omitted.

What is claimed is:

1. A method of operating a universal serial bus (USB) device on a network, the method comprising:
    receiving one or more USB frames from a host device via the network, wherein the one or more USB frames are encapsulated in one or more data packets based on a communications protocol associated with network;
    synchronizing a local clock signal of the USB device with a clock signal of the host device using a clock synchronization mechanism of the communications protocol;
    receiving a frame count value from the host device, wherein the frame count value indicates a number of USB frames transmitted by the host device at a first instance of time;
    receiving a media time value from the host device, wherein the media time value indicates the first instance of time at which the frame count value is recorded;
    determining, at the USB device, a number of USB frames transmitted by the host device based, at least in part, on the synchronized local clock signal, the frame count value, and the media time value; and
    processing the one or more USB frames based, at least in part, on the number of USB frames transmitted by the host device.

2. The method of claim 1, wherein the communications protocol corresponds to an IEEE 802.11 wireless protocol.

3. The method of claim 1, wherein synchronizing the local clock signal comprises:
    receiving one or more beacon frames from the host device, wherein at least one of the beacon frames includes a timing synchronization function (TSF) value; and
    adjusting the local clock signal based on the received TSF value.

4. The method of claim 1, further comprising:
    storing the one or more USB frames in a data buffer.

5. The method of claim 4, wherein determining the number of USB frames transmitted by the host device comprises:
    updating a local frame counter based, at least in part, on a number of the USB frames stored in the data buffer; and
    determining the number of USB frames transmitted by the host device based on the local frame counter.

6. The method of claim 1, wherein the frame count value and the media time value are received together in at least one of the USB frames.

7. The method of claim 5, wherein determining the number of USB frames transmitted by the host device further comprises:
    synchronizing the local frame counter with a USB frame counter in the host device based, at least in part, on the local clock signal, the frame count value, and the media time value.

8. The method of claim 7, wherein processing the one or more USB frames comprises:
    processing the one or more USB frames when the local frame counter reaches a first threshold.

9. A method of operating a computing device on a network, the method comprising:
    encapsulating one or more universal serial bus (USB) frames in one or more data packets based on a communications protocol associated with the network;
    transmitting the one or more data packets, including the one or more encapsulated USB frames, to one or more client devices via the network;
    updating a USB frame counter based on a number of USB frames transmitted to the one or more client devices;
    transmitting a frame count value to the one or more client devices, wherein the frame count value indicates a current value of the USB frame counter;
    transmitting a media time value to the one or more client devices, wherein the media time value indicates a time at which the frame count value is recorded; and
    transmitting a set of synchronization data, to the one or more client devices, that allows the one or more client devices to process the one or more USB frames, wherein the set of synchronization data includes clock synchronization data that allows the one or more client devices to determine a number of USB frames transmitted by the computing device based at least in part on the frame count value, the media time value, and respective local clock signals of the one or more client devices.

10. The method of claim 9, wherein the communications protocol corresponds to an IEEE 802.11 wireless protocol.

11. The method of claim 10, wherein transmitting the set of synchronization data comprises:
broadcasting the clock synchronization data within one or more beacon frames, wherein the clock synchronization data includes a timing synchronization function (TSF) value.

12. The method of claim 9, further comprising:
encapsulating the frame count value and the media time value, together, in at least one of the one or more USB frames.

13. The method of claim 9, further comprising:
transmitting a processing request to the one or more client devices, wherein the processing request includes an instruction to begin processing the one or more USB frames.

14. The method of claim 13, wherein the processing request includes a frame count threshold, and wherein the one or more client devices are to begin processing the one or more USB frames when a number of USB frames transmitted by the computing device is equal to the frame count threshold.

15. The method of claim 14, wherein the set of synchronization data allows the one or more client devices to begin processing the one or more USB frames, concurrently.

16. A universal serial bus (USB) device, comprising:
a receiver to receive one or more USB frames from a host device via a network, wherein the one or more USB frames are encapsulated in one or more data packets based on a communications protocol associated with the network;
one or more processors; and
a memory storing instructions that, when executed by the one or more processors, causes the USB device to:
synchronize a local clock signal of the USB device with a clock signal of the host device using a clock synchronization mechanism of the communications protocol;
receive a frame count value from the host device, wherein the frame count value indicates a number of USB frames transmitted by the host device at a first instance of time;
receive a media time value from the host device, wherein the media time value indicates the first instance of time at which the frame count value is recorded;
determine a number of USB frames transmitted by the host device based, at least in part, on the synchronized local clock signal, the frame count value, and the media time value; and
process the one or more USB frames based, at least in part, on the number of USB frames transmitted by the host device.

17. The USB device of claim 16, wherein the wireless communications protocol corresponds to an IEEE 802.11 wireless protocol, and wherein the receiver is to further:
receive one or more beacon frames from the host device, wherein at least one of the beacon frames includes a timing synchronization function (TSF) value.

18. The USB device of claim 16, wherein execution of the instructions to synchronize the local clock signal with the clock signal of the host device causes the USB device to:
adjust the local clock signal based on the received TSF value.

19. The USB device of claim 16, further comprising:
a data buffer to store the one or more USB frames.

20. The USB device of claim 19, wherein execution of the instructions to determine the number of USB frames transmitted by the host device causes the USB device to:
update a local frame counter based, at least in part, on a number of the USB frames stored in the data buffer; and
determine the number of USB frames transmitted by the host device based on the local frame counter.

21. The USB device of claim 16, wherein the frame count value and the media time value are received together in at least one of the one or more USB frames.

22. The USB device of claim 20, wherein execution of the instructions to determine the number of USB frames transmitted by the host device causes the USB device to:
synchronize the local frame counter with a USB frame counter in the host device based, at least in part, on the local clock signal, the frame count value, and the media time value.

23. The USB device of claim of claim 22, wherein execution of the instructions to process the one or more USB frames causes the USB device to:
process the one or more USB frames when the local frame counter reaches a first threshold.

24. A computing device, comprising:
one or more processors;
a memory storing instructions that, when executed by the one or more processors, causes the computing device to encapsulate one or more universal serial bus (USB) frames in one or more data packets based on a communications protocol associated with a network; and
a transmitter to:
transmit the one or more data packets, including the one or more encapsulated USB frames, to one or more client devices via the network;
update a USB frame counter based on a number of USB frames transmitted to the one or more client devices;
transmit a frame count value to the one or more client devices, wherein the frame count value indicates a current value of the USB frame counter;
transmit a media time value to the one or more client devices, wherein the media time value indicates a time at which the frame count value is recorded; and
transmit a set of synchronization data, to the one or more client devices, that allows the one or more client devices to process the one or more USB frames, wherein the set of synchronization data includes clock synchronization data that allows the one or more client devices to determine a number of USB frames transmitted by the computing device based at least in part on the frame count value, the media time value, and respective local clock signals of the one or more client devices.

25. The computing device of claim 24, wherein the communications protocol corresponds to an IEEE 802.11 wireless protocol, and wherein the transmitter is to transmit the set of synchronization data by:

broadcasting the clock synchronization data within one or more beacon frames, wherein the clock synchronization data includes a timing synchronization function (TSF) value.

26. The computing device of claim 24, wherein execution of the instructions further causes the computing device to:

encapsulate the frame count value and the media time value, together, in at least one of the one or more USB frames.

27. The computing device of claim 24, wherein execution of the instructions further causes the computing device to:

generate a processing request, wherein the processing request includes an instruction to begin processing the one or more USB frames.

28. The computing device of claim 27, wherein the transmitter is to further:

transmit the processing request to the one or more client devices.

29. The computing device of claim 28, wherein the processing request includes a frame count threshold, and wherein the one or more client devices are to begin processing the one or more USB frames when a number of USB frames transmitted by the computing device is equal to the frame count threshold.

30. The computing device of claim 29, wherein the set of synchronization data allows the one or more client devices to begin processing the one or more USB frames, concurrently.

31. A computer-readable storage medium containing program instructions that, when executed by a processor provided within a universal serial bus (USB) device, causes the USB device to:

receive one or more USB frames from a host device via a network, wherein the one or more USB frames are encapsulated in one or more data packets based on a communications protocol associated with the network;

synchronize a local clock signal of the USB device with a clock signal of the host device using a clock synchronization mechanism of the communications protocol;

receive a frame count value from the host device, wherein the frame count value indicates a number of USB frames transmitted by the host device at a first instance of time;

receive a media time value from the host device, wherein the media time value indicates the first instance of time at which the frame count value is recorded;

determine a number of USB frames transmitted by the host device based, at least in part, on the synchronized local clock signal, the frame count value, and the media time value; and process the one or more USB frames based, at least in part, on the number of USB frames transmitted by the host device.

32. A computer-readable storage medium containing program instructions that, when executed by a processor within a computing device, causes the computing device to:

encapsulate one or more universal serial bus (USB) frames in one or more data packets based on a communications protocol associated with a network;

transmit the one or more data packets, including the one or more encapsulated USB frames, to one or more client devices via the network;

update a USB frame counter based on a number of USB frames transmitted to the one or more client devices;

transmit a frame count value to the one or more client devices, wherein the frame count value indicates a current value of the USB frame counter;

transmit a media time value to the one or more client devices, wherein the media time value indicates a time at which the frame count value is recorded; and transmit a set of synchronization data, to the one or more client devices, that allows the one or more client devices to process the one or more USB frames, wherein the set of synchronization data includes clock synchronization data that allows the one or more client devices to determine a number of USB frames transmitted by the computing device based at least in part on the frame count value, the media time value, and respective local clock signals of the one or more client devices.

33. A universal serial bus (USB) device, comprising:

means for receiving one or more USB frames from a host device via a network, wherein the one or more USB frames are encapsulated in one or more data packets based on a communications protocol associated with the network;

means for synchronizing a local clock signal of the USB device with a clock signal of the host device using a clock synchronization mechanism of the communications protocol;

means for receiving a frame count value from the host device, wherein the frame count value indicates a number of USB frames transmitted by the host device at a first instance of time;

means for receiving a media time value from the host device, wherein the media time value indicates the first instance of time at which the frame count value is recorded;

means for determining a number of USB frames transmitted by the host device based, at least in part, on the synchronized local clock signal, the frame count value, and the media time value; and means for processing the one or more USB frames based, at least in part, on the number of USB frames transmitted by the host device.

34. A computing device, comprising:

means for encapsulating one or more universal serial bus (USB) frames in one or more data packets based on a communications protocol associated with a network;

means for transmitting the one or more data packets, including the one or more encapsulated USB frames, to one or more client devices via the network;

means for updating a USB frame counter based on a number of USB frames transmitted to the one or more client devices;

means for transmitting a frame count value to the one or more client devices, wherein the frame count value indicates a current value of the USB frame counter;

means for transmitting a media time value to the one or more client devices, wherein the media time value indicates a time at which the frame count value is recorded; and means for transmitting a set of synchronization data, to the one or more client devices via the wireless network, that allows the one or more client devices to process the one or more USB frames, wherein the set of synchronization data includes clock synchronization data that allows the one or more client devices to determine a number of USB frames transmitted by the computing device based at least in part on the frame count value, the media time value, and respective local clock signals of the one or more client devices.

* * * * *